S. G. LEWIS.

WATCH HOLDING AND ATTACHING DEVICE.

APPLICATION FILED NOV. 9, 1916.

Reissued Dec. 12, 1916. 14,231.

WITNESSES

J. Herbert Bradley.

Marvin J. Bonasson

INVENTOR

Seneca G. Lewis by Christy and Christy his attorneys

UNITED STATES PATENT OFFICE.

SENECA G. LEWIS, OF GREENSBURG, PENNSYLVANIA, ASSIGNOR OF ONE-HALF TO GEORGE W. DAUM, OF JEANNETTE, PENNSYLVANIA.

WATCH HOLDING AND ATTACHING DEVICE.

14,231. Specification of Reissued Letters Patent. Reissued Dec. 12, 1916.

Original No. 1,176,840, dated March 28, 1916, Serial No. 51,793, filed September 21, 1915. Application for reissue filed November 9, 1916. Serial No. 130,488.

*To all whom it may concern:*

Be it known that I, SENECA G. LEWIS, residing at Greensburg, in the county of Westmoreland and State of Pennsylvania, a citizen of the United States, have invented or discovered certain new and useful Improvements in Watch Holding and Attaching Devices, of which improvements the following is a specification.

The object of my invention is to provide an improved combined watch holding and attaching device whereby a watch may be securely, although removably, engaged and in turn removably attached to a carrier in such manner as to be free from the prejudicial effect of the vibration or other movements of the carrier.

A further and more specific object of my invention is to provide an article of the character described which may be readily attached to the end of an automobile steering rod.

In the accompanying sheet of drawings, which forms part of my specification, I have illustrated the preferred embodiment of my invention.

Figure 1:
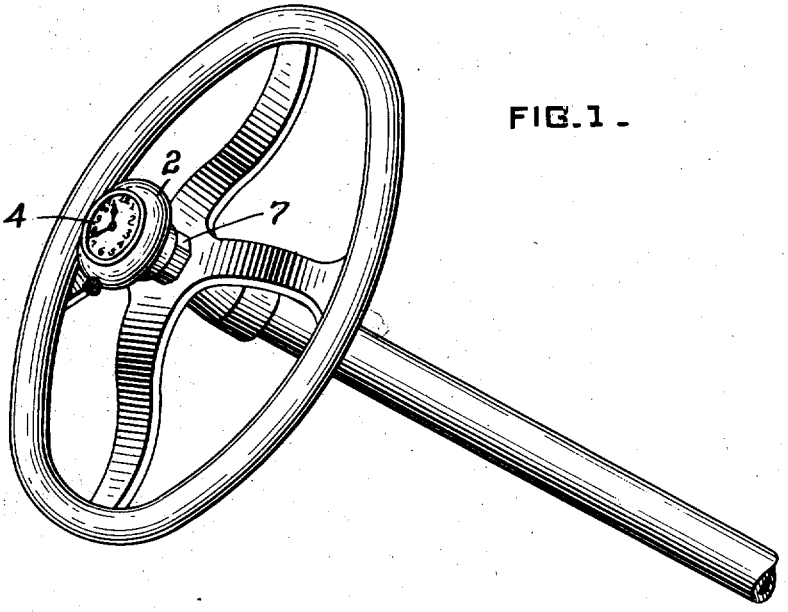
Figure 2:
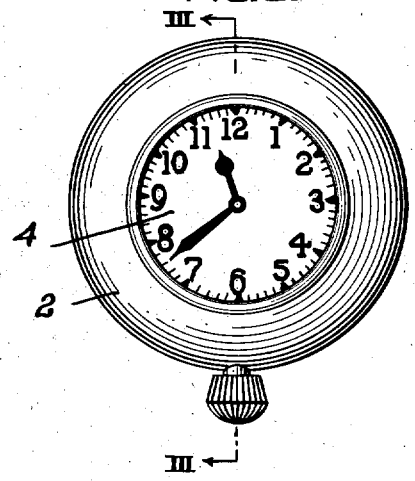

Figure 1 is a perspective view of the watch holding and attaching device applied to an automobile steering rod; Fig. 2 a face view, to enlarged scale, of the device; and Fig. 3 a sectional view taken on the line III—III, Fig. 2.

Figure 3:
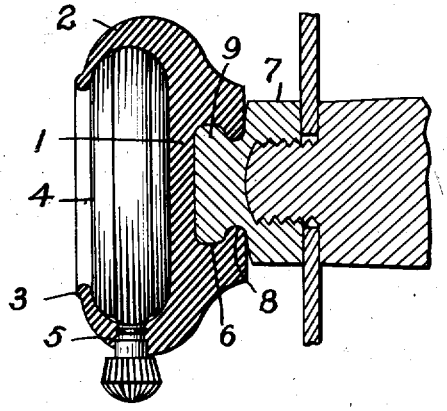

The watch holder in its preferred form, as illustrated particularly in Fig. 3, comprises a medial web 1, having on one side thereof a watch receiving cup 2 provided with an overhanging peripheral flange 3 adapted to retain a watch 4. As will be seen, the wall of the cup 2 is provided with a hole 5 to receive the stem of the watch. On the other side of the web 1 there is formed a second cup 6 adapted to receive a supporting member or carrier such as a nut 7, and this cup is also provided with an overhanging flange 8 for engaging the supporting member. The holder, as thus described, is made of elastic material and preferably of an integral body of soft rubber, that is, rubber of such consistency that the holder will yield on one side to receive a watch, and on the other side the carrier.

My invention further contemplates in its more specific aspect a watch holding and attaching device, comprising in combination a rigid attaching member and a resilient watch holder of the general character described above. This feature of my invention, although not limited to any specific purpose, finds particular adaptability to the steering rod of an automobile. In a number of makes of machines the rod terminates with a nut. By making the rigid attaching member in the form of a cap nut 7 (Fig. 3), provided with a laterally extending flange 9, the regular nut of the steering rod may be replaced by the cap nut, thus affording a ready and neat appearing attachment of the watch holder to the rod, as seen in Fig. 1. It will be observed of this construction that the elastic watch retainer may be rotated with relation to the nut 7. The nut and elastic watch holder may therefore be provided as an article of manufacture to be applied to the steering rod, and when applied and the nut tightened, the elastic holder may be turned upon the nut to bring the face of the watch in the desired position.

The convenience of having a watch permanently mounted on an automobile part where it is in plain view of the driver has heretofore been greatly diminished, first, because of the fact that jolts, jars and vibrations tend to injure the watch and make it unreliable and useless as an accurate time keeper. This difficulty is overcome in my present invention by the elasticity of the watch holder. Secondly, stray electric currents flowing through the metal parts of an automobile have disturbed the accuracy of a watch attached to such parts by a metallic support. By making my improved watch holder of rubber, the watch may be completely insulated from such currents.

I claim as my invention:

1. A watch holding and attaching device consisting of a disk-shaped body of elastic material, such disk-shaped body being provided on one side with an inturned annular flange forming a watch-receiving cup, and being provided on its opposite side with a second inturned annular flange forming a support-engaging cup.

2. A watch holding and attaching device formed of one continuous body of rubber and consisting of a disk-shaped body provided on its opposite faces with extending annular flanges, such flanges forming with the body from which they extend a watch pocket on one side and a support-engaging cup on the other, in combination with a support adapted to enter the said support-engaging cup and to sustain the device by means of the constrictive engagement of the walls of said support-engaging cup upon it.

3. A watch holding and attaching device comprising in combination, a supporting body having a laterally-extending flange at its outer end; and a watch holder formed of elastic material and consisting of a medial web, a watch-receiving and retaining cup on one side of said web, and a second cup on the other side of the web provided with an overhanging flange engaging the flange of said supporting body.

4. A watch holding and attaching device comprising in combination, a cap nut having a laterally-extending flange at its outer end; and a watch holder formed of elastic material and consisting of a medial web, a watch-receiving and retaining cup on one side of said web, and a second cup on the other side of the web provided with an overhanging flange engaging the flange of said nut.

5. A watch holding and attaching device comprising, in combination a supporting body having a laterally extending flange at its outer end, and a watch holder provided with an elastic walled cup making constrictive engagement upon said flanged body and rotatable thereon.

In testimony whereof I have hereunto set my hand.

SENECA G. LEWIS.

Witnesses:
A. H. Price,
Geo. W. Shiveley.